US010574424B2

(12) United States Patent
Mamidwar et al.

(10) Patent No.: US 10,574,424 B2
(45) Date of Patent: Feb. 25, 2020

(54) TRANSMISSION BANDWIDTH IMPROVEMENTS FOR DVB-S2X CHANNEL BONDING

(71) Applicant: Avago Technologies International Sales Pte. Limited, Singapore (SG)

(72) Inventors: Rajesh Mamidwar, San Diego, CA (US); Anand Tongle, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/687,643

(22) Filed: Aug. 28, 2017

(65) Prior Publication Data
US 2018/0062821 A1  Mar. 1, 2018

Related U.S. Application Data

(60) Provisional application No. 62/381,763, filed on Aug. 31, 2016.

(51) Int. Cl.
*H04L 5/00* (2006.01)
*H04W 72/04* (2009.01)
*H04N 21/234* (2011.01)
*H04W 36/16* (2009.01)
*H04N 21/61* (2011.01)
*H04N 21/2383* (2011.01)
*H04N 21/2362* (2011.01)
*H04N 21/236* (2011.01)

(52) U.S. Cl.
CPC .......... *H04L 5/0094* (2013.01); *H04L 5/0007* (2013.01); *H04W 72/0413* (2013.01); *H04W 72/0433* (2013.01); *H04N 21/234* (2013.01); *H04W 36/16* (2013.01)

(58) Field of Classification Search
CPC ................ H04L 5/0094; H04L 5/0007; H04N 21/23614; H04N 21/6143; H04N 21/2383; H04N 21/2362; H04N 21/234; H04W 72/0413; H04W 72/0433; H04W 36/16
See application file for complete search history.

(56) References Cited

U.S. PATENT DOCUMENTS

| | | | | |
|---|---|---|---|---|
| 6,119,213 A | * | 9/2000 | Robbins | ............. H04N 21/4305 375/E7.094 |
| 2004/0073929 A1 | * | 4/2004 | Morello | ................ H04L 1/0003 725/63 |

(Continued)

*Primary Examiner* — Andrew Lai
*Assistant Examiner* — Harry H Kim
(74) *Attorney, Agent, or Firm* — Foley & Lardner LLP

(57) ABSTRACT

In some aspects, the disclosure is directed to methods and systems for improved bandwidth for DVB-S2X bonded channels. A high bandwidth stream may be split to a plurality of partial streams, including inserted null packets. Modulators may remove the null packets while maintaining a synchronization counter. The counter value may be inserted in headers of transmitted data packets in reduced bandwidth output streams, without requiring explicit identification of removed or deleted null packets. Downstream modulators may recover and remerge the partial streams via the synchronization counters. As explicit deleted null packet identifiers are omitted, header sizes are reduced, further increasing payload/header efficiency ratios.

14 Claims, 7 Drawing Sheets

(56) References Cited

U.S. PATENT DOCUMENTS

| | | | |
|---|---|---|---|
| 2013/0235882 A1* | 9/2013 | Chen | H04L 41/0816 370/432 |
| 2015/0215058 A1* | 7/2015 | Yi | G09G 5/006 370/350 |
| 2015/0350724 A1* | 12/2015 | Hennenhoefer | H04H 20/63 725/82 |
| 2016/0337672 A1* | 11/2016 | Lee | H04N 21/236 |

* cited by examiner

TRANSMISSION BANDWIDTH IMPROVEMENTS FOR DVB-S2X CHANNEL BONDING

RELATED APPLICATIONS

This application claims the benefit of and priority to U.S. Provisional Application No. 62/381,763, entitled "Transmission Bandwidth Improvements for DVB-S2X Channel Bonding," filed Aug. 31, 2016, the entirety of which is hereby incorporated by reference.

FIELD OF THE DISCLOSURE

This disclosure generally relates to systems and methods for channel boding for digital video broadcasting.

BACKGROUND OF THE DISCLOSURE

Newly developed standards, including the developing Digital Video Broadcasting-Satellite-2nd Generation-Extended (DVB-S2X) standard, may allow for channel bonding to distribute a high bit rate multiplexed bit stream over multiple lower data rate transponders. For example, a 4K×2K video data stream (even encoded in accordance with the high efficiency video coding (HEVC) standard) may require 30-45 Mbps. This may be distributed over a plurality of lower rate channels, such as 4-6 8 Mbps transponder channels, and re-multiplexed at the receiver. Channel bonding thus allows combining multiple communications links (e.g. two or more physical links at layer 1 of the OSI model, two or more logical links at a higher layer such as the data link layer (layer 2) or packet layer (layer 3 or higher), etc.) in order to provide redundancy and/or increased throughput by splitting or striping data across the links. However, in many implementations, overhead may be required, such as timing and identification data, in order to allow the receiver to re-assemble or aggregate the original data stream. In some implementations, this overhead may be significant (e.g. 5%, 10%, or more) reducing the theoretical benefit of the bonding.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

- Section A describes embodiments of systems and methods for providing transmission bandwidth improvements for channel bonding, such as in DVB-S2X; and
- Section B describes a network environment and computing environment which may be useful for practicing embodiments described herein.

A. Providing Transmission Bandwidth Improvements for Channel Bonding

For transmitting high resolution 4 K×2 K data (even with HEVC encoding), program data rates of 30 to 45 Mbps are required. If such programs are transmitted as is, the efficiency of packing the programs on a single transponder/channel is drastically reduced. Accordingly, to keep the channel bandwidth utilization high, a single high bit rate multiplexed bit stream (such as one containing 4 K×2 K program data) can be split and distributed over multiple low data rate transponders, in a process referred to as channel bonding (each of the low data rate channels being considered a bonded channel).

Figure 1A:
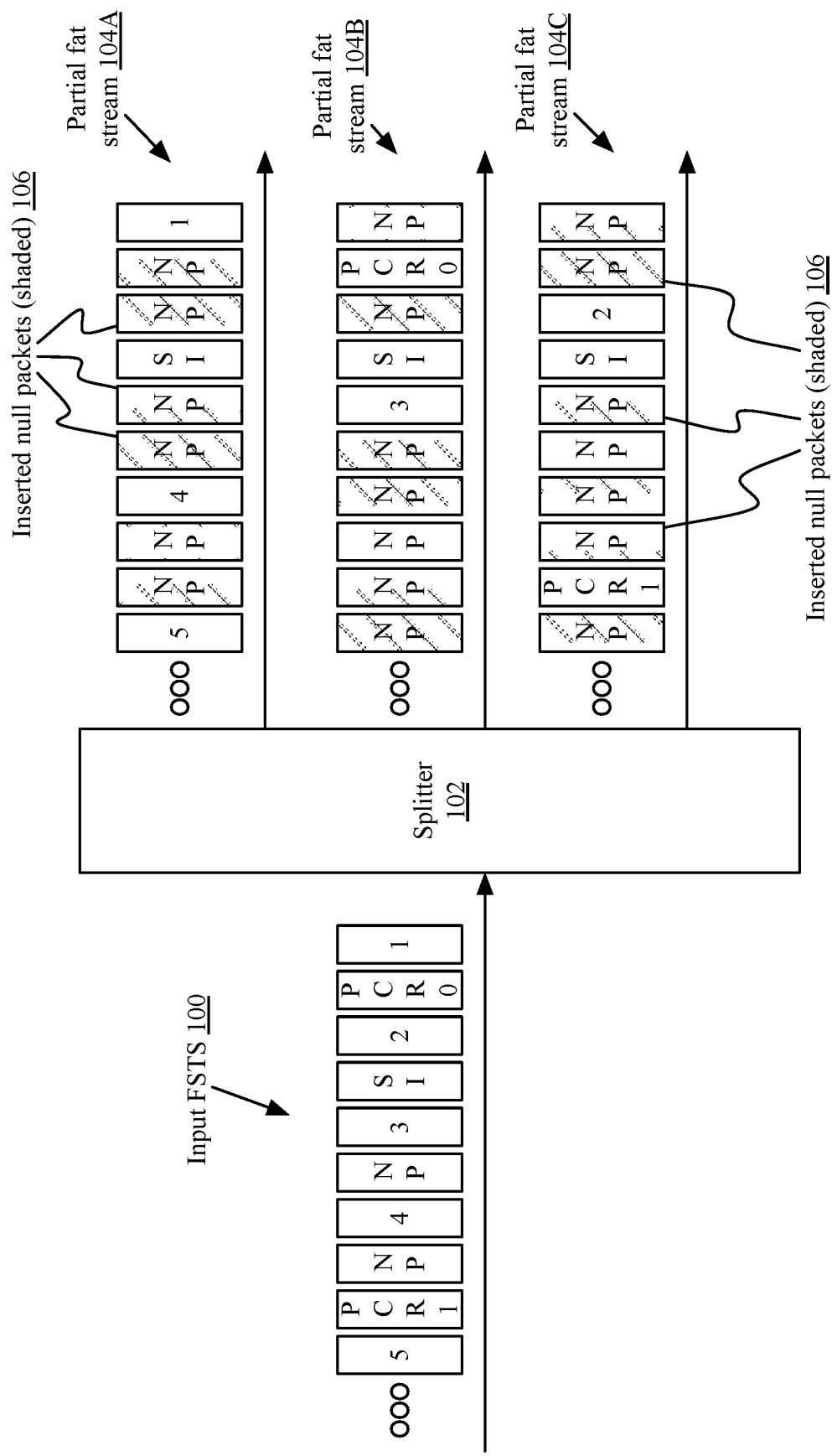
FIGS. 1A-1C are block diagrams of an implementation of channel bonding.

For example, and referring first to FIG. 1A, illustrated is a block diagram of a system for splitting an input channel over multiple lower rate channels. Under the DVB-S2X standard, which is incorporated herein by reference in its entirety, a statistically multiplexed high data rate or "fat" transport stream (input FSTS 100) may be split by a splitter 102 into multiple lower data rate partial fat streams (e.g. partial streams 104A-104C). In the implementation shown, while including only a subset of the input data, the partial fat streams 104 have the same data rate as the input stream 100. Accordingly, the splitter 102 may insert null packets 106 (illustrated as shaded blocks) into the partial streams 104 to maintain the data rate (e.g. splitter 102 need not perform substantial buffering, and one data packet or null packet may be transmitted on each partial stream 104). Specifically, while splitting the stream, if a number of data packets of the input stream 100 is fed to a single partial channel 104, the equivalent number of null packets is sent to the other partial channels 104. Such data packets may include portions of media data (e.g. data packets "1", "2", "3", "4", "5" as illustrated), program clock reference packets (e.g. "PCR0", "PCR1" as illustrated), and null packets received via the input (e.g. the unshaded "NP" packets illustrated, as opposed to shaded null packets "NP" added by splitter 102) such as those present in variable bit rate data streams. In some implementations as shown, service information packets (e.g. "SI") may be duplicated or distributed to each of the partial streams 104. This may provide reliability if one or more partial streams are interrupted. The splitter 102 may distribute the packets in any method, such as a round robin distribution as illustrated, or via any other type and form of distribution method.

Figure 1B:
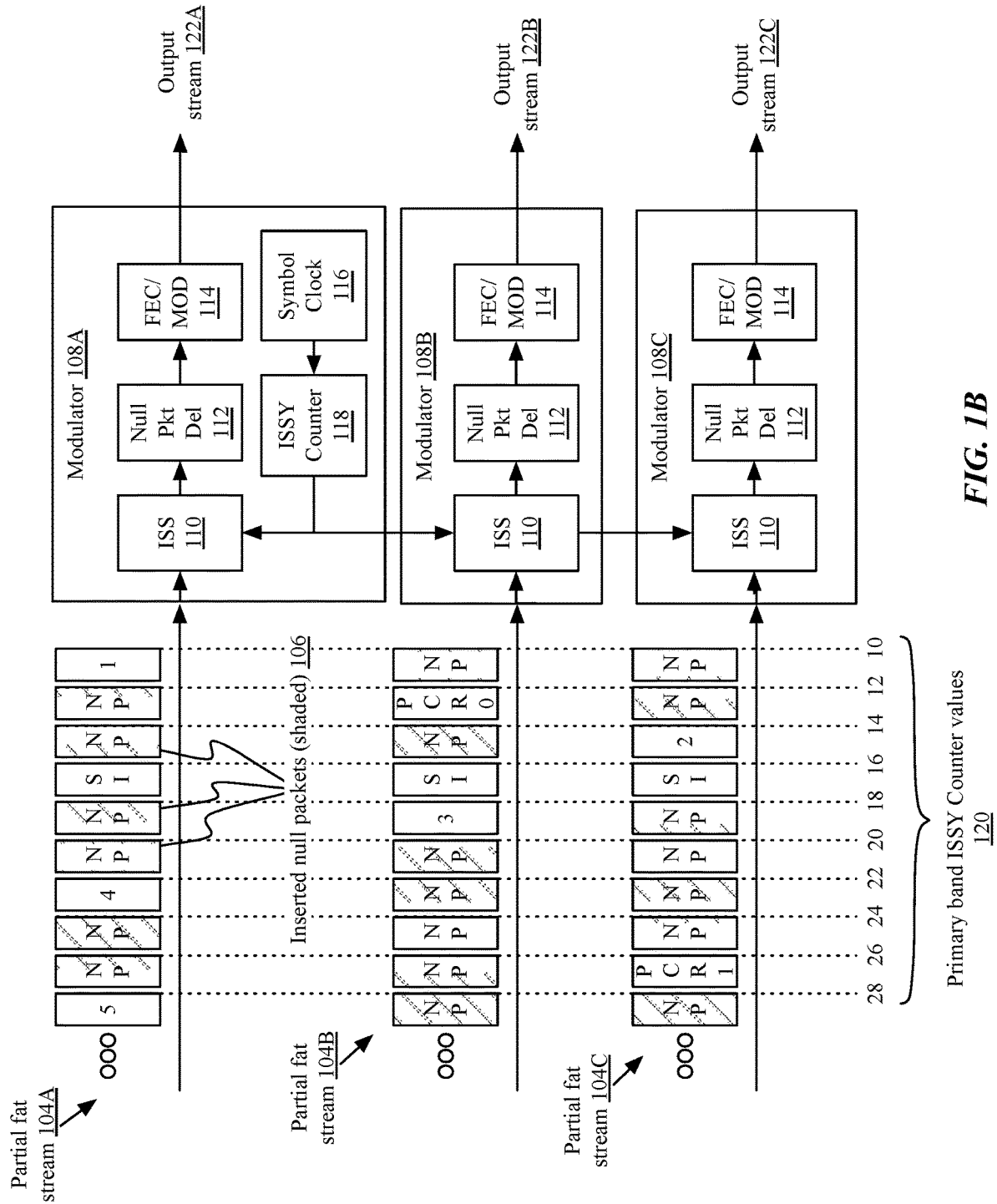

Continuing to FIG. 1B, illustrated is a next portion of a system for channel bonding of a DVB stream. Each of the partial fat streams 104, including the inserted null packets 106, may be provided to a corresponding modulator of a plurality of modulators (e.g. modulators 108A-108C). The modulators may include an input stream synchronizer (ISS 110), which may comprise a buffer for buffering input packets as necessary to ensure a constant bit rate and constant end-to-end transmission delay for input data. The modulators may also include a null packet deletion module (null pkt del 112), which may delete the inserted null packets (and, in many implementations, null packets received from the input stream and distributed to the partial streams as discussed above) from each partial stream. This allows the modulators to reduce the necessary transmission bandwidth for the output data streams 122A-122C. For example, in the implementation illustrated, for any packet other than SI packets (and including received null packets), the received packet is provided to one partial stream, and null packets are provided to the other two partial streams, with the designated stream rotating. Accordingly, in the implementation illustrated, at most, approximately 1/(# of partial streams) percent of the data on any partial stream is legitimate data (e.g. for three partial streams, roughly 67% of the packets on any partial stream are added null packets). The ratio of legitimate data to null packets is reduced further with null packets in the incoming data stream (and increased slightly due to the duplication of SI packets). Thus, null packet deleters 112 may reduce the data rate for output streams 122 to approximately 1/(# of partial streams) of the original (e.g. allowing, for example, a 45 Mbps stream to be divided among four 12 Mbps streams (assuming the SI packets require no more than 0.75 Mbps on each stream) or five 10 Mbps streams (assuming the SI packets require no more than 1 Mbps on each stream), etc.

Modulators 108 may also include modulation (MOD) hardware 114 for transmitting the lower bandwidth output data streams 122 via an output channel 112, e.g. via a satellite, microwave, terrestrial broadcast, fiber, copper, or other interface. In some implementations, modulation hardware 114 may also include forward error correction (FEC) hardware for adding error correction data to the output stream, although this may reduce efficiency slightly while increasing reliability.

In the example illustrated, when null packets are removed from each stream, the first partial stream has four data packets (i.e. 1, SI, 4, and 5), while the other two partial streams each have three data packets (i.e. PCR0, SI, and 3 on partial stream 104B; and 2, SI, and PCR1 on partial stream 104C). Different distributions and/or incoming data may result in similar imbalances. Accordingly, synchronization is required in order to allow a receiver to resynchronize output streams 122A-122C and allow aggregation or reassembly of the original data stream.

In some implementations, one modulator may be designated a "master" or "control" modulator 108A, and may include a symbol clock 116 and input stream synchronization (ISSY) counter 118 (clock 116 and counter 118 may be present in other modulators 108, for reliability (e.g. as backup master modulators) and/or for ease of manufacture). ISSY counter 118 may maintain a counter of input packets according to primary band ISSY counter values 120. For example, the ISSY counter 118 may be incremented upon receipt of each packet of the partial fat stream. As each partial fat stream includes the same number of packets (with input data packets interspersed with inserted null packets 106), each modulator can maintain synchronization according to the ISSY counter values by buffering input packets in ISS 110 as necessary. The master modulator 108A may distribute the counter value to other modulators 108 to ensure that each ISS 110 remains in synchronization.

Figure 1C:
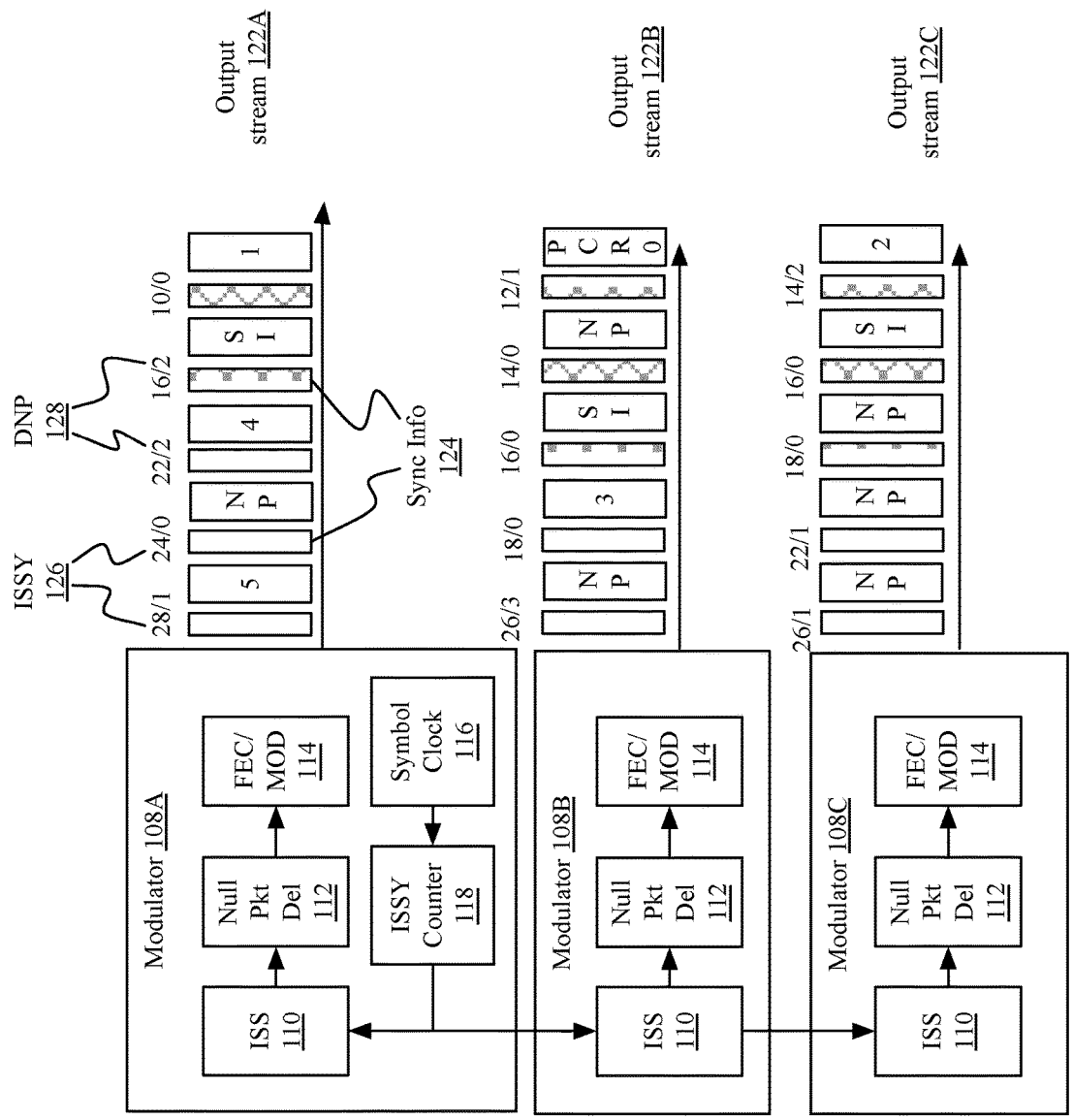

Continuing to FIG. 1C, illustrated are examples of output streams 122A-122C from modulators 108A-108C. As discussed above, in many implementations, inserted null packets may be removed from the input partial streams, reducing the bandwidth required to transmit the output streams 122, and potentially desynchronizing the streams, as discussed above. To allow a receiving demodulator (not illustrated) to rebuild a partial stream 104 from an output stream 122, the modulator 108 may append or insert synchronization information 124 into a header of each packet in the output stream. In one implementation, the synchronization information may include a value of the ISSY counter 126, and/or a number of deleted null packets 128. For example, and referring briefly back to FIG. 1B, a first partial fat stream 104A may include data packet 1 at ISSY counter value 10, two null packets at values 12 and 14, a service information packet at counter value 16, two more null packets at values 18 and 20, data packet 4 at value 22, two more null packets at values 24 and 26, and data packet 5 at value 28. Returning to FIG. 1C, the output stream 122A may include synchronization information 124 after the first data packet 1 indicating it was at ISSY counter value 10 via ISSY value field 126 and that 0 null packets were removed via deleted null packet (DNP) field 128 (shown in pairs as ISSY #/DNP #). Similarly, the stream 122A may indicate that SI packet was at counter value 16, with 2 null packets removed; and data packet 4 was at counter 22 with 2 null packets removed. Thus, the receiving demodulator may be able to buffer incoming packets and release them according to ISSY values to resynchronize the data, and/or may insert null packets in place of deleted null packets according to DNP values.

In some implementations, null packets may still be included in output streams 122 to provide constant bit rate outputs (e.g. where an input stream 100 included a null packet, the null packet may optionally be treated as a legitimate packet and not deleted by a null packet deleter 112). Accordingly and as shown, the output stream 122A may include a null packet after data packet 4, with identified ISSY counter value 24 and no deleted packets. Finally, output stream 122A may include data packet 5 identified at counter value 28 and 1 packet removed. Other output streams 122B-C may be similarly configured.

As shown, in many implementations, different output streams may include packets identified with the same ISSY counter values. For example, output stream 122B includes a null packet at counter value 14, a service information packet at counter value 16, and data packet 3 at counter value 18. Output stream 122C includes data packet 2 at counter value 14, a service information packet at counter value 16, and a null packet at counter value 18. When reassembling the partial streams, the demodulator may select to include only one of the packets at any indicated ISSY counter value, such as including valid or legitimate data packets 2 and 4 and discarding the spurious null packets at the same counter values. As discussed above, service information may be duplicated on multiple streams for reliability and/or for error correction purposes; and the demodulator may select to include one SI packet and discard the other, merge the packets, aggregate the packets, or otherwise remove the duplicate information.

Thus, in many implementations, while mapping the high bit rate stream to low bit rate modulators, most of the null packets are dropped and the number of dropped null packets is attached with every packet via DNP field 128 in a header of the packet. Similarly, to enable synchronization at the receiver, the ISSY counter value is appended with every packet.

In some implementations, the DNP information may be unnecessary in implementations of the systems and methods discussed herein. Specifically, the ISSY counter value 126 may be sufficient to ensure re-sequentialization or recovery of the bonded streams at the receiver, and the DNP information may be omitted. As the DNP field in various implementations may be up to 16 bits in length or longer, a small but significant efficiency improvement may result from omitting this field from the output streams 122, such as a gain of 1/192 or 0.52%.

ISSY and DNP values may have predetermined lengths (e.g. 8-bits, 16-bits, 32-bits, etc.) which may be the same or different, and/or may have dynamic lengths. In implementations having dynamic lengths, a length identifier may be included, or a predetermined string may be included to separate the fields. For example, in many implementations, the number of deleted null packets may be smaller than an ISSY counter value (which may potentially be very large, depending on length of the data or to allow long latencies before rolling over, such as 32-bits, 64-bits, 128-bits, etc.). Thus, a packet may include a length identifier (e.g. 4 bits) to indicate the length of a DNP field (e.g. correspondingly up to 16 bits), which may be preceded or followed by a predetermined-length ISSY field. This may reduce overhead while still providing added reliability of the DNP counter.

Although shown incrementing by two (e.g. counting sync information as a separate value), in some implementations, the ISSY counter value may be incremented by one for each combination of data (or null) packet and sync information.

Figure 2:
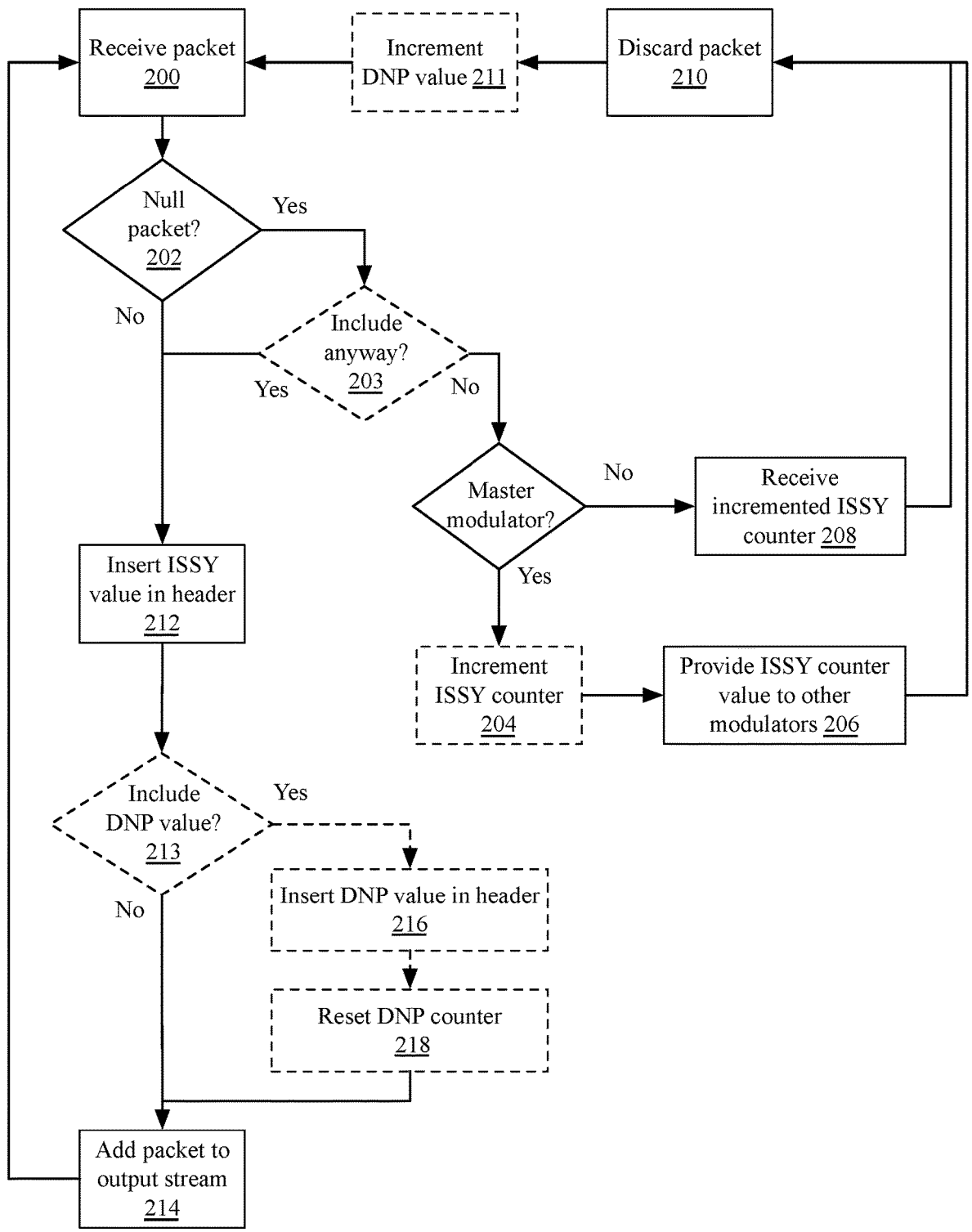
FIG. 2 is a flow chart of an implementation of a method for providing transmission bandwidth improvements for channel bonding.

Referring now to FIG. 2, illustrated is a flow chart of an implementation of a method for improving bandwidth for DVB channel bonding. As discussed above, a fat or high bandwidth input stream may be split by a splitter into a plurality of partial streams, with the splitter distributing a packet to one partial stream and, inserting null packets in other partial streams so that each partial stream has the same bitrate as the input stream. Each partial stream may be provided to a modulator of a plurality of modulators.

A modulator may receive a packet of a partial stream at step 200. The packet may be buffered in an input synchronizer as discussed above. At step 202, the modulator may determine if the packet is a null packet. A null packet may be identified via predetermined data (e.g. a string of 0's or other predetermined data) in the payload, or via an identifier in a header such as a predetermined bit in a valid or invalid or null data field.

If the packet is a null packet, then in some implementations, the null packet may still be included in the output stream, for example to maintain a constant bitrate in the output. Thus, in some implementations, at step 203 (shown in dashed lines indicating that the step may be optional in some implementations), the modulator may determine whether the null packet should be included in the output. Determining whether the null packet should be included may comprise, determining whether there is sufficient output bandwidth from the modulator to transmit the null packet, whether an output or transmission buffer of the modulator includes sufficient space for the null packet, and/or whether inclusion of the null packet is necessary to maintain a constant bitrate output. If the modulator determines the null packet should be transmitted, it may proceed with step 212, discussed below.

If the modulator determines the null packet shouldn't be transmitted, or in some implementations in which step 203 may be skipped, if the modulator is designated or acting as a master modulator as discussed above, then in some implementations, at step 204 (shown in dashed lines indicating that the step may be optional in some implementations), an ISSY counter value may be incremented. In other implementations, the ISSY counter value may correspond to a symbol clock of the modulator or encoder, and accordingly, the ISSY counter value may be directly read from the symbol clock for inclusion in outgoing packet headers (e.g. at step 212, discussed below).

At step 206, the master modulator may provide the ISSY counter value or symbol clock value to other modulators of the plurality of modulators to set corresponding ISSY counters or synchronize symbol clocks. The ISSY counter value or symbol clock value may be provided to other modulators via a control bus, internal bus, or similar interconnection. At step 210, the modulator may discard the null packet. In many implementations, the modulator may discard the null packet immediately after step 202 or 203, and may then perform steps 204-206.

If the modulator is not a master modulator, then at step 208, the modulator may receive the incremented ISSY counter value or symbol clock value and may set an internal counter or symbol clock. By relying on the master modulator's counter or symbol clock, each modulator may remain in synchronization. At step 210, the null packet may be discarded as discussed above.

In some implementations, a DNP value may be incremented at step 211 (shown in dashed lines indicating that the step may be optional in some implementations). As discussed above, the DNP value may comprise a count of a number of deleted null packets, so that a receiver device may generate and/or insert corresponding null packets. In other implementations in which the DNP value is not included in packet headers or transmitted in the output stream, step 211 may be skipped.

If a packet is determined to not be a null packet at step 202, then at step 212, the modulator may insert the value of its ISSY counter into a header of the packet or update a value of a predetermined ISSY counter field in the header of the packet. As discussed above, the ISSY counter may be locally maintained (e.g. by the master modulator) or may be received from a master modulator.

In some implementations, at step 213 (shown in dashed lines indicating that the step may be optional in some implementations), the device may determine if a DNP value should be included in the output (e.g. in the header, as discussed above). In some implementations, DNP values may be included for reliability or compatibility with various systems. In other implementations, the DNP values may be omitted. In some such implementations, step 213 may be skipped. Accordingly, at step 214, the packet may be added to an output stream and transmitted to downstream devices. In implementations in which the DNP value is omitted and/or step 213 is skipped, the packet may not include a DNP field or bytes corresponding to a DNP indicator, and may simply include the ISSY counter value.

In other implementations, a DNP value may be included. At step 216 (shown in dashed lines indicating that the step may be optional in some implementations), the value of a DNP counter may be inserted in the stream, e.g. in a header of the packet. At step 218 (shown in dashed lines indicating that the step may be optional in some implementations), the DNP counter may be reset. The packet, including ISSY counter value and DNP counter value, may be transmitted at step 214. In some implementations, step 218 may be performed after step 214.

In some implementations, steps 204-208 may also be performed if the packet is not a null packet. Thus, in some implementations, after inserting the ISSY value in the header at step 212 and either before or after adding the packet to the output stream at step 214, the master modulator may optionally increment the ISSY counter (step 204) and provide the counter value or symbol clock to the other modulators (step 206), and the other modulators may receive the counter or symbol clock (step 208). In such implementations, the ISSY counter may thus continue being incremented for each packet, regardless of whether it is a null packet. In a similar implementation, steps 204-208 may be performed prior to determining if the packet is a null packet at step 202. Thus, the method may include receiving the packet; incrementing and transmitting or receiving the counter value; determining if the packet is or is not a null packet; and respectively either discarding the packet or adding the ISSY value to a header and transmitting the packet.

Additionally, as discussed above, in some implementations, null packets may be retained to ensure constant bit rate outputs (e.g. step 203). In some implementations, steps 202 and/or 203 may be skipped for one or more null packets or may proceed to step 212 regardless of whether the packet or packets are null packets, and said null packet or packets may be transmitted at step 214. In other implementations, as discussed above, a determination of whether to include the packet may be made at step 203.

Accordingly, the above discussed systems and methods allow the packets to be transmitted on bonded channels without requiring inclusion of a DNP field, reducing header sizes, reducing overall bandwidth, and increasing payload/header efficiency ratios.

In one aspect, the present disclosure is directed to a method for improving bandwidth of multiplexed transmissions. The method includes receiving a first portion of a multiplexed stream, by a first modulator of a plurality of modulators, each of the plurality of modulators receiving a corresponding portion of the multiplexed stream. The method also includes, for each received packet of the first portion of the multiplexed stream: determining, by the first modulator, whether the packet is a null packet; and responsive to a determination that the packet either (i) is or (ii) is not a null packet, respectively (i) discarding the null packet or (ii) appending a value of a synchronization counter to the packet and transmitting the packet via an output of the first modulator.

In some implementations, the first modulator is a master modulator. In a further implementation, the method includes, for each received packet of the first portion of the multiplexed stream, incrementing the synchronization counter. In a still further implementation, the method includes, for each received packet of the first portion of the multiplexed stream, providing, by the first modulator to each of the other modulators of the plurality of modulators, the value of the incremented synchronization counter.

In some implementations, the first modulator is not a master modulator. In a further implementation, the method includes, for each received packet of the first portion of the multiplexed stream, receiving a value of the synchronization counter from the master modulator.

In some implementations, the method includes, for each received packet of the first portion of the multiplexed stream, incrementing a deleted null packet counter responsive to a determination that the packet is a null packet. In some implementations, the method includes, for each received packet of the first portion of the multiplexed stream, appending a value of a deleted null packet counter to the packet responsive to a determination that the packet is not a null packet. In a further implementation, the method includes, for each received packet of the first portion of the multiplexed stream, resetting the value of the deleted null packet counter after appending the value of the deleted null packet counter to the packet, responsive to the determination that the packet is not a null packet.

In some implementations, the method includes transmitting the packet lacking a value of a deleted null packet counter or omitting a deleted null packet from the transmitted packet or a header of the transmitted packet. In a further implementation, the method includes transmitting the packet to a demodulator, receipt of the packet triggering the demodulator to extract the value of the synchronization counter from the packet, determine that the extracted synchronization counter value indicates that at least one null packet should be included, and add the corresponding at least one null packet prior to the received packet.

In another aspect, the present disclosure is directed to a method for improving bandwidth of bonded channel transmissions. The method includes receiving, by a first demodulator of a plurality of demodulators, a packet output by a modulator of a plurality of modulators transmitting a multiplexed stream, the packet lacking a deleted null packet field. The method also includes extracting, by the first demodulator, a synchronization counter value from the received packet; and generating, by the first demodulator, at least one null packet based on the value of the extracted synchronization counter.

In some implementations, the method includes providing the received packet and the generated at least one null packet to a demultiplexer configured to aggregate packets from each of the plurality of demodulators to generate a combined stream.

In another aspect, the present disclosure is directed to a system for improving bandwidth of multiplexed transmissions. The system includes a plurality of modulators, each configured to receive a corresponding portion of a plurality of portions of a multiplexed stream. A first modulator of the plurality of modulators is configured to, for each received packet of a corresponding first portion of the multiplexed stream: determine whether the packet is a null packet; and responsive to a determination that the packet either (i) is or (ii) is not a null packet, respectively (i) discard the null packet or (ii) append a value of a synchronization counter to the packet and transmit the packet via an output of the first modulator.

In some implementations, the first modulator is a master modulator. In a further implementation, the first modulator is further configured to, for each received packet of the first portion of the multiplexed stream, increment the synchronization counter. In a still further implementation, the first modulator is further configured to, for each received packet of the first portion of the multiplexed stream, provide the value of the incremented synchronization counter to each of the other modulators of the plurality of modulators.

In some implementations, the first modulator is not a master modulator. In a further implementation, the first modulator is further configured to, for each received packet of the first portion of the multiplexed stream, receive a value of the synchronization counter from the master modulator.

In some implementations, the first modulator is further configured to, for each received packet of the first portion of the multiplexed stream, increment a deleted null packet counter responsive to a determination that the packet is a null packet. In some implementations, the first modulator is further configured to, for each received packet of the first portion of the multiplexed stream, append a value of a deleted null packet counter to the packet responsive to a determination that the packet is not a null packet. In a further implementation, the first modulator is further configured to, for each received packet of the first portion of the multiplexed stream, reset the value of the deleted null packet counter after appending the value of the deleted null packet counter to the packet, responsive to the determination that the packet is not a null packet.

In some implementations, the first modulator is further configured to transmit the packet lacking a value of a deleted null packet counter or omit the value of the deleted null packet counter from the packet or packet header. In a further implementation, the first modulator is further configured to transmit the packet to a demodulator, receipt of the packet triggering the demodulator to extract the value of the synchronization counter from the packet, determine that the extracted synchronization counter value indicates that at least one null packet should be included, and add the corresponding at least one null packet prior to the received packet.

B. Computing and Network Environment

Figure 3A:
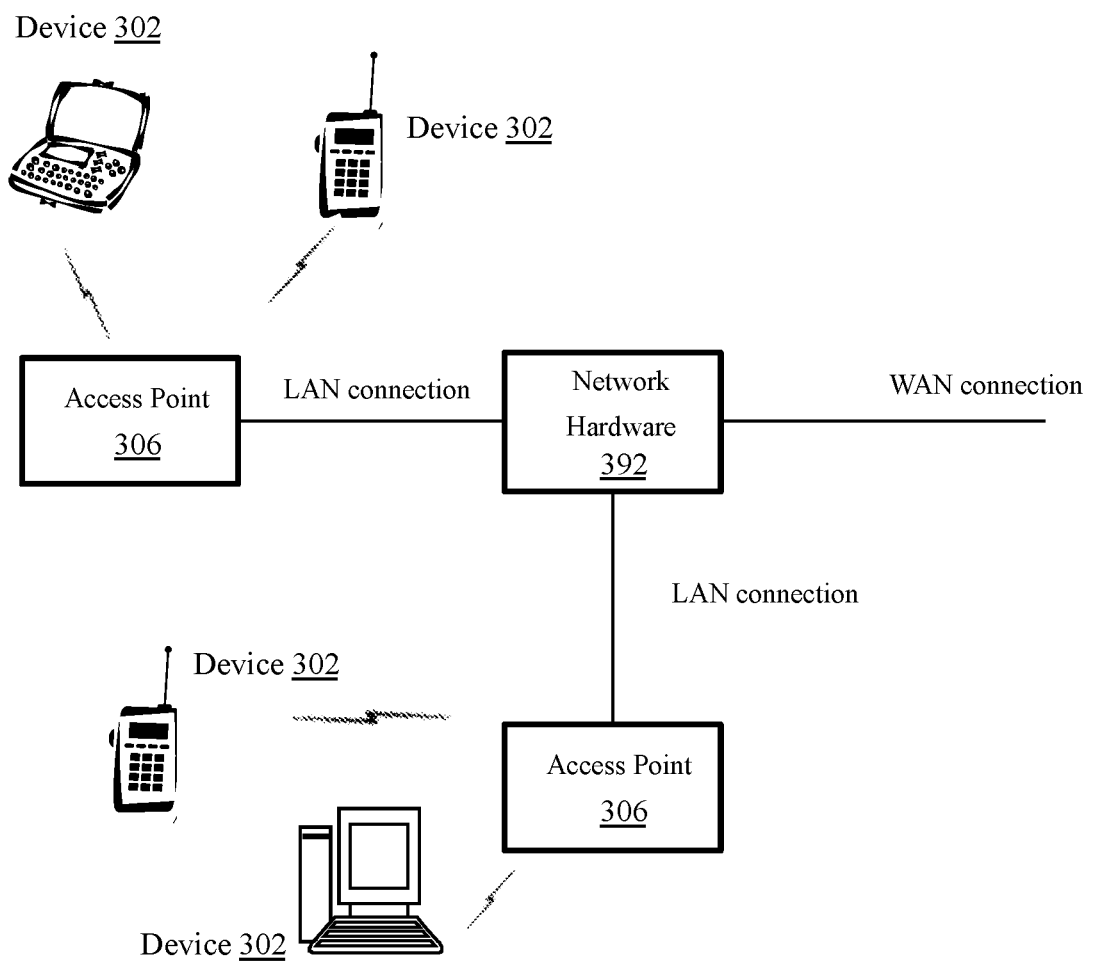
FIG. 3A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 3A, an embodiment of a network environment is depicted. In brief overview, the network environment includes a wireless communication system that includes one or more access points 306, one or more wireless communication devices 302 and a network hardware component 392. The wireless communication devices 302 may for example include laptop computers 302, tablets 302, personal computers 302 and/or cellular telephone devices 302. The details of an embodiment of each wireless communication device and/or access point are described in greater detail with reference to FIGS. 3B and 3C. The network environment can be an ad hoc network environment, an infrastructure wireless network environment, a subnet environment, etc. in one embodiment.

The access points (APs) 306 may be operably coupled to the network hardware 392 via local area network connections. The network hardware 392, which may include a router, gateway, switch, bridge, modem, system controller, appliance, etc., may provide a local area network connection for the communication system. Each of the access points 306 may have an associated antenna or an antenna array to communicate with the wireless communication devices 302 in its area. The wireless communication devices 302 may register with a particular access point 306 to receive services from the communication system (e.g., via a SU-MIMO or MU-MIMO configuration). For direct connections (e.g., point-to-point communications), some wireless communication devices 302 may communicate directly via an allocated channel and communications protocol. Some of the wireless communication devices 302 may be mobile or relatively static with respect to the access point 306.

In some embodiments an access point 306 includes a device or module (including a combination of hardware and software) that allows wireless communication devices 302 to connect to a wired network using Wi-Fi, or other standards. An access point 306 may sometimes be referred to as an wireless access point (WAP). An access point 306 may be configured, designed and/or built for operating in a wireless local area network (WLAN). An access point 306 may connect to a router (e.g., via a wired network) as a standalone device in some embodiments. In other embodiments, an access point can be a component of a router. An access point 306 can provide multiple devices 302 access to a network. An access point 306 may, for example, connect to a wired Ethernet connection and provide wireless connections using radio frequency links for other devices 302 to utilize that wired connection. An access point 306 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 306 may be used for (e.g., in-home or in-building) wireless networks (e.g., IEEE 802.11, Bluetooth, ZigBee, any other type of radio frequency based network protocol and/or variations thereof). Each of the wireless communication devices 302 may include a built-in radio and/or is coupled to a radio. Such wireless communication devices 302 and/or access points 306 may operate in accordance with the various aspects of the disclosure as presented herein to enhance performance, reduce costs and/or size, and/or enhance broadband applications. Each wireless communication devices 302 may have the capacity to function as a client node seeking access to resources (e.g., data, and connection to networked nodes such as servers) via one or more access points 306.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 3B:
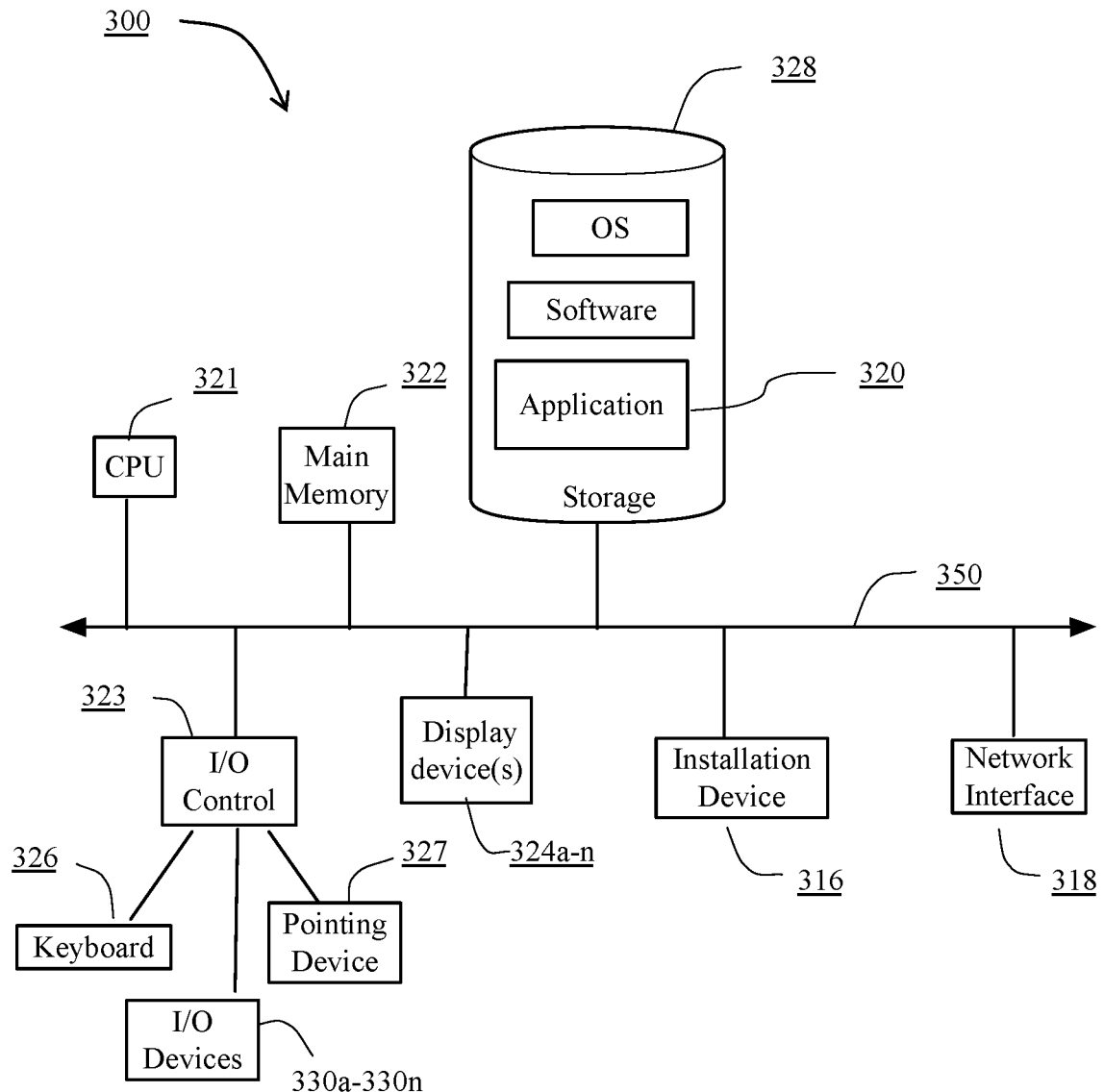
FIGS. 3B and 3C are block diagrams depicting embodiments of computing devices useful in connection with the methods and systems described herein.
Figure 3C:
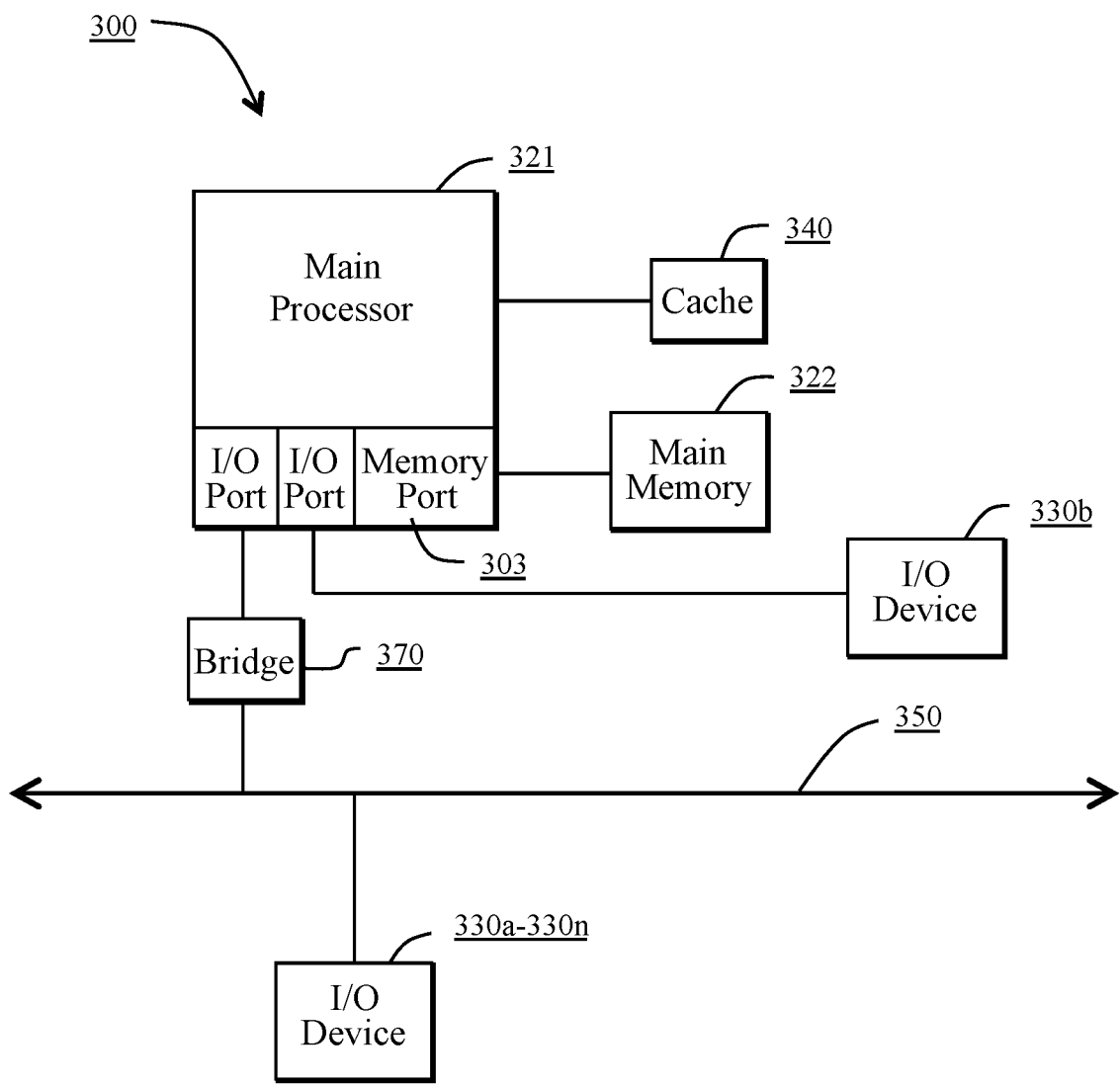

The communications device(s) 302 and access point(s) 306 may be deployed as and/or executed on any type and form of computing device, such as a computer, network device or appliance capable of communicating on any type and form of network and performing the operations described herein. FIGS. 3B and 3C depict block diagrams of a computing device 300 useful for practicing an embodiment of the wireless communication devices 302 or the access point 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-324n, a keyboard 326 and a pointing device 327, such as a mouse. The storage device 328 may include, without limitation, an operating system and/or software. As shown in FIG. 3C, each computing device 300 may also include additional optional elements, such as a memory port 303, a bridge 370, one or more input/output devices 330a-330n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 300 may be based on any of these processors, or any other processor capable of operating as described herein.

Main memory unit 322 may be one or more memory chips capable of storing data and allowing any storage location to be directly accessed by the microprocessor 321, such as any type or variant of Static random access memory (SRAM), Dynamic random access memory (DRAM), Ferroelectric RAM (FRAM), NAND Flash, NOR Flash and Solid State Drives (SSD). The main memory 322 may be based on any of the above described memory chips, or any other available memory chips capable of operating as described herein. In the embodiment shown in FIG. 3B, the processor 321 communicates with main memory 322 via a system bus 350 (described in more detail below). FIG. 3C depicts an embodiment of a computing device 300 in which the processor communicates directly with main memory 322 via a memory port 303. For example, in FIG. 3C the main memory 322 may be DRDRAM.

FIG. 3C depicts an embodiment in which the main processor 321 communicates directly with cache memory 340 via a secondary bus, sometimes referred to as a backside bus. In other embodiments, the main processor 321 communicates with cache memory 340 using the system bus 350. Cache memory 340 typically has a faster response time than main memory 322 and is provided by, for example, SRAM, BSRAM, or EDRAM. In the embodiment shown in FIG. 3C, the processor 321 communicates with various I/O devices 330 via a local system bus 350. Various buses may be used to connect the central processing unit 321 to any of the I/O devices 330, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the processor 321 may use an Advanced Graphics Port (AGP) to communicate with the display 324. FIG. 3C depicts an embodiment of a computer 300 in which the main processor 321 may communicate directly with I/O device 330b, for example via HYPERTRANSPORT, RAPIDIO, or INFINIBAND communications technology. FIG. 3C also depicts an embodiment in which local busses and direct communication are mixed: the processor 321 communicates with I/O device 330a using a local interconnect bus while communicating with I/O device 330b directly.

A wide variety of I/O devices 330a-330n may be present in the computing device 300. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 323 as shown in FIG. 3B. The I/O controller may control one or more I/O devices such as a keyboard 326 and a pointing device 327, e.g., a mouse or optical pen. Furthermore, an I/O device may also provide storage and/or an installation medium 316 for the computing device 300. In still other embodiments, the computing device 300 may provide USB connections (not shown) to receive handheld USB storage devices such as the USB Flash Drive line of devices manufactured by Twintech Industry, Inc. of Los Alamitos, Calif.

Referring again to FIG. 3B, the computing device 300 may support any suitable installation device 316, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 300 may further include a storage device, such as one or more hard disk drives or redundant arrays of independent disks, for storing an operating system and other related software, and for storing application software programs such as any program or software 320 for implementing (e.g., configured and/or designed for) the systems and methods described herein. Optionally, any of the installation devices 316 could also be used as the storage device. Additionally, the operating system and the software can be run from a bootable medium.

Furthermore, the computing device 300 may include a network interface 318 to interface to the network 304 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 300 communicates with other computing devices 300' via any type and/or form of gateway or tunneling protocol such as Secure Socket Layer (SSL) or Transport Layer Security (TLS). The network interface 318 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

In some embodiments, the computing device 300 may include or be connected to one or more display devices 324a-324n. As such, any of the I/O devices 330a-330n and/or the I/O controller 323 may include any type and/or form of suitable hardware, software, or combination of hardware and software to support, enable or provide for the connection and use of the display device(s) 324a-324n by the computing device 300. For example, the computing device 300 may include any type and/or form of video adapter, video card, driver, and/or library to interface, communicate, connect or otherwise use the display device(s) 324a-324n. In one embodiment, a video adapter may include multiple connectors to interface to the display device(s) 324a-324n. In other embodiments, the computing device 300 may include multiple video adapters, with each video adapter connected to the display device(s) 324a-324n. In some embodiments, any portion of the operating system of the computing device 300 may be configured for using multiple displays 324a-324n. One ordinarily skilled in the art will recognize and appreciate the various ways and embodiments that a computing device 300 may be configured to have one or more display devices 324a-324n.

In further embodiments, an I/O device 330 may be a bridge between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 300 of the sort depicted in FIGS. 3B and 3C may operate under the control of an operating system, which control scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 300 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 300 has sufficient processor power and memory capacity to perform the operations described herein.

In some embodiments, the computing device 300 may have different processors, operating systems, and input devices consistent with the device. For example, in one embodiment, the computing device 300 is a smart phone, mobile device, tablet or personal digital assistant. In still other embodiments, the computing device 300 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A method for improving bandwidth of multiplexed transmissions, comprising:
   receiving a first portion of a multiplexed stream, by a first modulator of a plurality of modulators, each of the plurality of modulators receiving a corresponding portion of the multiplexed stream; and
   determining, by the first modulator, that a first packet of the first portion of the multiplexed stream is a null packet;
   responsive to the determination that the first packet is a null packet, incrementing a value of a synchronization counter and a value of a deleted null packet counter, and discarding the null packet;
   determining that a second packet of the first portion of the multiplexed stream is not a null packet; and
   responsive to the determination that the second packet is not a null packet,
      incrementing the value of the synchronization counter,
      appending the value of the synchronization counter to the second packet, and
      transmitting the second packet via an output of the first modulator, wherein the transmitted second packet lacks the value of the deleted null packet counter.

2. The method of claim 1, wherein the first modulator is a master modulator.

3. The method of claim 1, further comprising, for each received packet of the first portion of the multiplexed stream, providing, by the first modulator to each of the other modulators of the plurality of modulators, the value of the incremented synchronization counter.

4. The method of claim 1, wherein the first modulator is not a master modulator.

5. The method of claim 4, further comprising, for each received packet of the first portion of the multiplexed stream, receiving a value of the synchronization counter from the master modulator.

6. The method of claim 1, wherein transmitting the second packet further comprises transmitting the second packet to a demodulator, receipt of the second packet triggering the demodulator to extract the value of the synchronization counter from the second packet, determine that the extracted synchronization counter value indicates that at least one null packet should be included, and add the corresponding at least one null packet prior to the received second packet.

7. A method for improving bandwidth of bonded channel transmissions, comprising:
- receiving, by a first demodulator of a plurality of demodulators, a packet output by a modulator of a plurality of modulators transmitting a multiplexed stream,
  - wherein the modulator increments a value of a synchronization counter and a value of a null packet counter responsive to receiving a null packet,
  - wherein the modulator increments the value of the synchronization counter and appends the value of the synchronization counter to a non-null packet responsive to receiving the non-null packet, and
  - wherein the packet received by the first demodulator lacks a deleted null packet field;
- extracting, by the first demodulator, the value of the synchronization counter from the received packet; and
- generating, by the first demodulator, at least one null packet based on the value of the extracted synchronization counter.

8. The method of claim 7, further comprising providing the received packet and the generated at least one null packet to a demultiplexer configured to aggregate packets from each of the plurality of demodulators to generate a combined stream.

9. A system for improving bandwidth of multiplexed transmissions, comprising:
- a plurality of modulators, each configured to receive a corresponding portion of a plurality of portions of a multiplexed stream;
- wherein a first modulator of the plurality of modulators is configured to:
  - determine that a first packet of the first portion of the multiplexed stream is a null packet,
  - responsive to the determination that the first packet is a null packet, increment a value of a synchronization counter and a deleted null packet counter, and discard the null packet,
  - determine that a second packet of the first portion of the multiplexed stream is not a null packet, and
  - responsive to the determination that the second packet is not a null packet, increment the value of the synchronization counter, append the value of the synchronization counter to the second packet, and transmit the second packet via an output of the first modulator, wherein the transmitted second packet lacks the value of the deleted null packet counter.

10. The system of claim 9, wherein the first modulator is a master modulator.

11. The system of claim 9, wherein the first modulator is further configured to, for each received packet of the first portion of the multiplexed stream, provide the value of the incremented synchronization counter to each of the other modulators of the plurality of modulators.

12. The system of claim 9, wherein the first modulator is not a master modulator.

13. The system of claim 12, wherein the first modulator is further configured to, for each received packet of the first portion of the multiplexed stream, receive a value of the synchronization counter from the master modulator.

14. The system of claim 9, wherein the first modulator is further configured to transmit the second packet to a demodulator, receipt of the second packet triggering the demodulator to extract the value of the synchronization counter from the second packet, determine that the extracted synchronization counter value indicates that at least one null packet should be included, and add the corresponding at least one null packet prior to the received second packet.

* * * * *